Patented Aug. 8, 1950

2,518,388

UNITED STATES PATENT OFFICE 2,518,388

RESIN ADHESIVES AND PROCESSES OF PRODUCING SAME

William G. Simons, Newark, Del., assignor to American Cyanamid Company, New York, N. Y., a corporation of Maine No Drawing. Application April 18, 1945,
Serial No. 589,103

16 Claims. (Cl. 154—45.9)

This invention relates to the preparation of improved adhesive compositions. More particularly, it relates to the improvement of hot or cold setting adhesives to make them suitable for use as gap-filling cements in addition to their utilization for thin or thick glue lines. Specifically, the invention relates to an improvement in the preparation of a urea-formaldehyde adhesive.

Urea-formaldehyde condensation products with or without fillers or extenders find extensive use in the field of adhesives. The property of water solubility of the urea-aldehyde products enables an application of the adhesive to be made in an economical manner by the utilization of water as the solvent. Such aqueous solutions of adhesives are applicable only when thin glue lines are required and when the surfaces to be joined are smooth, as for example, in the gluing of plywood. When the viscosity of an adhesive is low it is difficult to apply on rough surfaces or in thick glue lines because of the excessive fluidity. On the other hand, when the viscosity is high, cracking may result upon setting. Partial correction of excessive fluidity and cracking is accomplished by the incorporation of inert fillers, such as wood meal, starches or flour, into the adhesive composition. Further improvements are realized by impregnating fillers, such as cellulosic fillers, with substances which serve to decrease the volatility of the water during the curing stage. Even though improved characteristics resulted, a need for a more stable and efficient glue was found necessary.

An object of this invention is to produce an improved hot or cold setting adhesive.

Another object of this invention is to prepare a cold-setting, gap-filling cement which gives better adhesion and resists cracking upon setting.

A further object of this invention is to prepare a urea-formaldehyde resin suitable for use as a gap-filling cement.

According to this invention, a gap-filling cement is obtained which has excellent properties, some of which are: resistance to cracking, resistance to deleterious effects of water, good stability upon aging, desirable viscosities, good bonding characteristics regardless of the pressure, temperature or thickness of glue lines, and pronounced improvement in dimensional stability.

The superior properties are obtained by incorporating into the adhesive formation a compound containing a furane ring structure, e. g. furfuryl alcohol or furfural. Furfuryl alcohol has been found to give excellent results. The amount of furfuryl alcohol added to the urea-formaldehyde resin may vary within such limits where the molar ratio of furfuryl alcohol to urea is less than 1:1. Formulations containing, in parts by weight, from about 0.05 part to 0.5 part of furfuryl alcohol to 1 part of urea resin give good results. However, best results are realized when the ratio in parts by weight of urea-formaldehyde resin to furfuryl alcohol is about 1:0.4.

Fillers or extenders may or may not be utilized. When fillers or extenders are used they should preferably be inert, insoluble, and non-swellable when treated with water. The amount of filler used may vary but to retain the superior adhesive characteristics it is preferred to use not more than 20 parts, by weight, of filler based on the weight of the dry resin. For best results, the fillers or extenders, if acidic, should be neutralized with bases, e. g. sodium hydroxide, triethanolamine and the like.

The dimensional stability of the product of this invention is outstanding. The stabilities of several urea-adhesives, including the product disclosed herein, were determined by subjecting them to heat treatment after being cast into cones. These cast products were cured for 24 hours at 78° F. followed by a heat treatment for 24 hours at 176° F. and the results showed that the adhesive prepared according to this invention was the only one which retained its shape without cracking or crazing. It was also observed that a more uniform dispersion of the catalyst resulted in improved stability.

The working-life stability of an adhesive is an important factor which deserves consideration, due to the fact that an appreciable change in working life as a result of aging can result in precluding its use for certain applications. The working life of a composition prepared according to this invention was determined after subjecting the composition to a temperature of 78° F. for a period of 12 weeks. It was found that no appreciable change had occurred in the working life of the adhesive.

The hardening catalysts are chosen from among acids or acid yielding compounds which catalyze the hardening of the adhesive at a desired rate, depending upon whether a shorter or longer working life is desirable. A catalyst made up of 3 parts by weight of ammonium chloride and 10 parts by weight of water is found to be satisfactory for a longer working life while a solution, in parts by weight, of 2 parts ammonium chloride, 1 part ferric chloride and 7 parts water, gives a faster cure and thus a shorter working life of the adhesive. From about 0.005 part to 0.2 part by weight of catalyst to 1 part by weight of resin yields a composition with satisfactory curing characteristics.

Stability of the adhesive syrup upon storage for long periods is attained by keeping the syrup under alkaline conditions by incorporating into the mixture any suitable base which is compatible with the syrup and which is non-volatile at the temperatures under which the adhesive is stored or reacted. The alkalinity is preferably kept low so that the acidic catalyst, when added does not become exhausted by a neutralization reaction. The neutralization reaction involving the catalyst may be obviated by neutralizing the adhesive just prior to addition of the catalyst.

For some uses it is important that the acidity of the adhesive syrup, after adding the acidic hardening catalyst, be not too great. An extremely low pH value can in some instances be detrimental to the materials being joined or glued together. In order to avoid any possible excess acidity, a suitable buffer is added to the syrup during the process of preparation or just prior to the addition of the hardening catalyst. For example, tricalcium phosphate buffers the syrup during the curing so that the pH does not fall below about 2.5.

This invention is not limited to urea-formaldehyde resins for other aldehyde condensation products may be used, e. g. phenol-formaldehyde resins, and aminotriazine-aldehyde resins (such as melamine-formaldehyde resins). Other aldehydes or aldehyde liberating substances may be used in place of formaldehyde, e. g. paraformaldehyde, acetaldehyde, crotonaldehyde, benzaldehyde and the like. The aldehyde condensation products may also be used alone or in admixture with other resins.

The urea resin used in the following examples is one containing formaldehyde to urea in the molar ratio of 1.7:1. However, other molar ratios may also be used, e. g. from 1:1 to 2:1 of formaldehyde to urea. Furthermore, the terms "urea resin" and "urea-formaldehyde resin" as used throughout the specification and claims refer to a liquid state which contains 70% solids. The use of a liquid resin is not a prerequisite for the achievements of the objects of this invention for a solid resin may be used advantageously.

The following examples are given by way of illustration and not in limitation:

Example 1

A. A kettle is charged with the following materials:

286 parts of urea resin
80 parts of furfuryl alcohol
44 parts of wood flour
1.1 parts of triethanolamine
2 parts of tricalcium phosphate The above materials, having a pH value of about 8, are slowly heated to about 90° C. during a period of about ½ hour. The temperature is held at 90° C. for about 15 minutes then cooled to about 30° C. during a period of about 80 minutes. The cooled product is then discharged from the kettle.

B. A catalyst suitable for about a 6 hour working life is made of the following materials:

3 parts of ammonium chloride
10 parts of water

C. A catalyst yielding about a 2-hour working life is formulated as follows:

2 parts of ammonium chloride
1 part of ferric chloride
7 parts of water

Example 2

A. The following materials are charged into a kettle:

1430 parts of urea resin
400 parts of furfuryl alcohol
5 parts of triethanolamine The above materials are heated slowly under alkaline conditions with agitation, up to about 90° C. during a period of ½ hour, then cooled to about 30° C.

B. A catalyst composition is prepared by blending together 90 parts of wood flour, 4.5 parts of tricalcium phosphate and 18 parts of ammonium chloride.

Example 3

The product made according to Example 1 was subjected to tests as provided by the "Army-Navy Aeronautical Specification Glue; Cold Setting Resins," AN-G-8, dated April 25, 1942.

| Property | Requirements AN-G-8 Specification | Product of Invention |
|---|---|---|
| Working life | 2-8 hrs. at 70° F | Slow catalyst—6 hrs. Fast catalyst—2 hrs. |
| Glue line pH | 2.5 minimum | 2.9-3.2. |
| Block shear strength | 2800 p. s. i. minimum. | 3637 p. s. i.—57% Wood Failure. |
| Plywood shear strength: | | |
| Dry | 340 p. s. i. minimum. | 510 p. s. i.—63% Wood Failure. |
| Wet | 280 p. s. i. minimum. | 387 p. s. i.—38% Wood Failure. |
| Stability | 2 mos. at 80° F | >3 mos. at 80° F. |

Example 4

The product of Example 1 was subjected to the following tests provided by the "Aeronautical Engineering Division, Royal Canadian Air Force," Specification DTD-484.

| Property | Canadian Specification | Product of Invention |
|---|---|---|
| Lap strength: | | |
| Dry | 600 p. s. i. minimum | >830 p. s. i.—80% Wood Failure. |
| Wet | 450 p. s. i. minimum | >777 p. s. i.—26% Wood Failure. |
| Gap strength | do | 662 p. s. i.—46% Wood Failure. |

From the foregoing examples, it is seen that the products prepared according to this invention exceed minimum requirements of a good adhesive by a wide margin. The adhesive is not limited to use as a plywood glue, but can be used for many purposes, such as in the manufacture of cardboard containers, adhesive tapes, impregnation of textile materials, gap-cement, gluing of veneers, wall-paper adhesive, as well as in molding compositions, casting resin and in laminating varnishes.

The preparation of the adhesive composition is not limited to processes requiring elevated temperatures. However, it is preferred to subject the compositions to heat treatments as disclosed in the foregoing examples. A composition prepared without use of heat undergoes a change in the working life for several days and thereafter the working life remains constant, whereas when having been subjected to a heat treatment, the working life of the adhesive composition remains constant throughout the storage period.

Obviously, many modifications and variations in the processes and compositions described herein may be made without departing from the spirit and scope of the invention as defined in the appended claims.

I claim:

1. An acid hardenable adhesive, the resin syrup component of which comprises a urea-formaldehyde resin having a mol ratio of urea to formaldehyde of 1:1 to 1:2, and furfuryl alcohol, said syrup having a pH value of at least 7, and the weight ratio of furfuryl alcohol to urea-formaldehyde resin is from 0.05:1 to 0.5:1.

2. An acid hardenable adhesive, the resin syrup component of which comprises a urea-formaldehyde resin having a mol ratio of urea to formaldehyde of 1:1.7, and furfuryl alcohol, said syrup having a pH value of at least 7, and the weight ratio of furfuryl alcohol to urea-formaldehyde resin is 0.4:1.

3. An acid hardenable adhesive, the resin syrup component of which comprises a urea-formaldehyde resin having a mol ratio of urea to formaldehyde of 1:1 to 1:2, furfuryl alcohol, and triethanolamine present in an amount sufficient to produce in said syrup a pH value of at least 7, and the weight ratio of furfuryl alcohol to urea-formaldehyde resin is from 0.05:1 to 0.5:1.

4. An acid hardenable adhesive, the resin syrup component of which comprises an urea-formaldehyde resin, having a mol ratio of urea to formaldehyde of 1:1 to 1:2, furfuryl alcohol, and an inert filler, said syrup having a pH value of at least 7, and the weight ratio of furfuryl alcohol to urea-formaldehyde resin is from 0.05:1 to 0.5:1.

5. An acid hardenable adhesive, the resin syrup component of which comprises an urea-formaldehyde resin having a mol ratio of urea to formaldehyde of 1:1 to 1:2, 0.05 to 0.5 parts of furfuryl alcohol per part of resin, up to 20 per cent inert filler based on the weight of resin, and triethanolamine present in amounts sufficient to produce a pH value of at least 7 in said syrup.

6. An adhesive comprising an urea-formaldehyde resin having a mol ratio of urea to formaldehyde of 1:1 to 1:2, furfuryl alcohol, and an acidic hardening catalyst, and the weight ratio of furfuryl alcohol to urea-formaldehyde resin is from 0.05:1 to 0.5:1, and said catalyst is present in amounts from 0.005 to 0.2 parts by weight per part of resin.

7. An adhesive comprising an urea-formaldehyde resin having a mol ratio of urea to formaldehyde of 1:1 to 1:2, furfuryl alcohol and ammonium chloride, the weight ratio of furfuryl alcohol to urea-formaldehyde resin is from 0.05:1 to 0.5:1, and said ammonium chloride is present in amounts from 0.005 to 0.2 parts by weight per part of resin.

8. An adhesive comprising an urea-formaldehyde resin having a mol ratio of urea to formaldehyde of 1:1 to 1:2, furfuryl alcohol, and a mixture of ammonium chloride and ferric chloride, the weight ratio of furfuryl alcohol to urea-formaldehyde resin is from 0.05:1 to 0.5:1, and said mixture of ammonium chloride and ferric chloride is present in amounts from 0.005 to 0.2 parts by weight per part of resin.

9. An adhesive comprising an urea-formaldehyde resin having a mol ratio of urea to formaldehyde of 1:1 to 1:2, furfuryl alcohol, a salt which in the presence of an acid, buffers the adhesive at an acid pH above 2.5, and an acidic hardening catalyst, and the weight ratio of furfuryl alcohol to urea-formaldehyde resin is from 0.05:1 to 0.5:1, and said catalyst is present in amounts from 0.005 to 0.2 parts by weight per part of resin.

10. An acid hardenable adhesive, the syrup component of which comprises, in parts by weight, 286 parts of a 70% solution of urea-formaldehyde resin having a mol ratio of urea to formaldehyde of 1:1 to 1:2, and 80 parts of furfuryl alcohol, 44 parts wood flour, 2 parts tricalciumphosphate, and 1.1 parts triethanolamine.

11. A process for the preparation of an acid hardenable adhesive resin syrup having a pH value of at least 7, comprising heating up to 90° C. and under alkaline conditions, a mixture of an urea-formaldehyde resin having a mol ratio of urea to formaldehyde of 1:1 to 1:2, and furfuryl alcohol, the weight ratio of furfuryl alcohol to urea-formaldehyde resin is from 0.05:1 to 0.5:1, and cooling the resultant stable syrup.

12. A process for the preparation of an acid hardenable adhesive resin syrup comprising heating up to 90° C. a mixture of urea-formaldehyde resin having a mol ratio of urea to formaldehyde of 1:1 to 1:2, and furfuryl alcohol, the weight ratio of furfuryl alcohol to urea-formaldehyde resin is 0.05:1 to 0.5:1, and cooling the resultant stable syrup.

13. An article of manufacture comprising a plurality of cellulosic members united by an adhesive as disclosed in claim 8.

14. An article of manufacture comprising a plurality of wood plies united by an adhesive as disclosed in claim 7.

15. An article of manufacture comprising a plurality of members united by an adhesive as disclosed in claim 6.

16. An adhesive comprising an urea-formaldehyde resin having a mol ratio of urea to formaldehyde of 1:2, furfuryl alcohol, and a small amount of an acidic hardening catalyst, and the weight of furfuryl alcohol to urea-formaldehyde is 0.4:1.

WILLIAM G. SIMONS.

REFERENCES CITED

The following references are of record in the file of this patent:

UNITED STATES PATENTS

| Number | Name | Date |
| --- | --- | --- |
| 1,924,748 | Novotny | Aug. 29, 1933 |
| 2,197,357 | Widmer | Apr. 16, 1940 |
| 2,306,924 | Zerweck | Dec. 29, 1942 |
| 2,313,953 | Loughborough | Mar. 16, 1943 |
| 2,321,493 | Korten | June 8, 1943 |
| 2,334,526 | Allison | Nov. 16, 1943 |
| 2,335,701 | Root | Nov. 30, 1943 |
| 2,340,045 | D'Alelio | Jan. 25, 1944 |
| 2,343,973 | Harvey | Mar. 14, 1944 |
| 2,345,966 | Fiedler | Apr. 4, 1944 |
| 2,366,049 | Payne | Dec. 26, 1944 |
| 2,397,451 | West | Mar. 26, 1946 |
| 2,413,624 | Harris | Dec. 31, 1946 |